United States Patent [19]
Kerkhoff

[11] Patent Number: 4,879,920
[45] Date of Patent: Nov. 14, 1989

[54] ANTIBACKLASH GEARS INCLUDING RACK AND PINION GEARS

[76] Inventor: Ewald F. Kerkhoff, 4365 Loch Alpine Dr. E., Ann Arbor, Mich. 48103

[21] Appl. No.: 37,532

[22] Filed: Apr. 13, 1987

[51] Int. Cl.$^4$ .............................................. F16H 1/04
[52] U.S. Cl. ...................................... 74/465; 74/422
[58] Field of Search ................................. 74/465, 422

[56] References Cited

U.S. PATENT DOCUMENTS

| | | |
|---|---|---|
| 277,802 | 5/1883 | Stanley et al. ........................ 74/465 |
| 477,292 | 6/1892 | Bradley ................................. 74/465 |
| 594,110 | 11/1897 | Higgins ................................. 74/465 |
| 860,536 | 7/1907 | Ellingham ............................. 74/465 |
| 1,828,114 | 10/1931 | Hubbard . |
| 2,509,161 | 5/1950 | Meyers ................................. 74/422 |
| 2,548,603 | 4/1951 | Hallstrand ............................ 74/440 |
| 2,966,806 | 1/1961 | Luning ................................. 74/409 |
| 3,035,454 | 5/1962 | Luning ................................. 74/440 |
| 3,037,396 | 6/1962 | Martin ................................. 74/409 |
| 3,122,938 | 3/1964 | Visser ................................. 74/409 |
| 3,213,704 | 10/1965 | McDougal ............................ 74/449 |
| 3,310,990 | 3/1967 | Zettel ................................. 74/409 |
| 3,709,055 | 1/1973 | Grove ................................. 74/462 |
| 3,845,670 | 11/1974 | Grayson ............................... 74/465 |
| 4,036,071 | 6/1977 | McKnight ........................ 74/243 R |
| 4,066,356 | 1/1978 | Parker ................................. 355/63 |
| 4,116,081 | 9/1978 | Luttrell ............................ 74/243 R |
| 4,140,026 | 2/1979 | Rouverol ............................. 74/461 |
| 4,155,599 | 5/1979 | Groger ................................. 299/43 |
| 4,222,282 | 9/1980 | Taig ................................. 74/457 |
| 4,228,696 | 10/1980 | Jablonsky ............................ 74/499 |
| 4,270,401 | 6/1981 | Davidson ............................. 74/462 |
| 4,292,857 | 10/1981 | Matusz ................................. 74/466 |
| 4,294,132 | 10/1981 | Matusz ................................. 74/462 |
| 4,305,307 | 12/1981 | Kiunke ................................. 74/409 |
| 4,487,088 | 12/1984 | Olson ................................. 74/462 |

FOREIGN PATENT DOCUMENTS

| | | |
|---|---|---|
| 576483 | 4/1933 | Fed. Rep. of Germany ........ 74/461 |
| 1041745 | 10/1958 | Fed. Rep. of Germany ........ 74/422 |
| 74247 | 11/1960 | France ................................. 74/422 |

*Primary Examiner*—Rodney H. Bonck
*Assistant Examiner*—Scott Anchell
*Attorney, Agent, or Firm*—James M. Deimen

[57] ABSTRACT

The meshing gear teeth comprise cylindrical profile teeth on a gear or rack and circular arc profile teeth on the other gear or pinion. Each cylindrical profile tooth is preferably mounted for free rotation about the cylindrical axis of the tooth. Driving engagement of the gears rotates the contacting cylindrical teeth, thereby providing rolling contact between the meshing gear teeth. At any instant, at least two cylindrical teeth on one gear are in engagement with one tooth on the other gear. With the motion of the meshing gears, the cylindrical profile teeth rotate into and out of the roots of the other gear without loss of rolling contact from entrance to exit. The constant contact and multi tooth engagement prevents backlash relative movement between the gears.

13 Claims, 4 Drawing Sheets

ANTIBACKLASH GEARS INCLUDING RACK AND PINION GEARS

BACKGROUND OF THE INVENTION.

The field of the invention pertains to antibacklash gear that mesh, including rack and pinion gears and, in particular, to gear tooth geometries that both minimize sliding friction and limit backlash between the gears.

Antibacklash rack and pinion gear sets are disclosed in U.S. Pat. Nos. 2,548,603, 4,066,356 and 4,228,696. The first two patents utilize offset teeth on parallel racks to provide a constant load in opposite directions on a mutual pinion. The latter patent utilizes a spring-loaded pin to provide a constant load between the rack and the pinion. U.S. Pat. No. 4,222,282 discloses a spring-loaded rack in combination with a specific tooth geometry to substantially eliminate the separating forces between the pinion and the rack.

Antibacklash gears utilizing displaced parallel gears meshing with common pinions are disclosed in U.S. Pat. Nos. 2,966,806, 3,035,454 and 3,037,396. In the first two patents, spring means are utilized to displace the teeth on the parallel gears and in the latter patent, mechanical fasteners are used to displace the parallel gears. U.S. Pat. 3,122,938 discloses an elastic web between a rigid hub and a rigid rim and teeth to preload the gear set and reduce backlash. U.S. Pat. No. 3,213,704 discloses light duty gear sets, wherein the gears are positioned to cause a resilient distortion and radial flexing to provide the zero backlash effect. More recently, U.S. Pat. No. 4,305,307 discloses a separate driven pinion connected to a torsion spring shaft that is adjusted to twist and thereby load the antibacklash driven gear.

Numerous patents have issued disclosing a wide variety of specific geometries to reduce noise and wear characteristics of gear sets. U.S. Pat. No. 1,828,114 discloses mating involute spur gears with sufficient teeth so formed that at all times at least two teeth of each mating gear mesh with at least two teeth on the other gear, thereby preventing overloading of a single tooth on each gear. U.S. Pat. No. 4,140,026 discloses an improvement to conformal gearing by providing flexure to the concave teeth to accommodate the changing geometry as the teeth wear or the center to center distance between the gears increases. Circular arc gear teeth are disclosed in the pinion and internal gear sets of U.S. Pat. No. 4,270,401, wherein a specific tooth geometry is specified.

Specific gear tooth geometries for helical gears are disclosed in U.S. Pat. Nos. 4,292,857 and 4,294,132, both directed to teeth of changing thickness and changing pitch diameter in traversing from the left to the right side of each gear. The specific geomety is directed to controlling backlash between the meshing gears. Specific tooth geometries for rack and pinion backlash elimination is disclosed in U.S. Pat. No. 3,310,990. In this disclosure, the involute gear and rack have modified tooth profiles which define gear contact depending upon the position of the rack relative to the pinion.

Gears that mesh with pins and rollers are sometimes referred to as sprockets, in particular, when the pins or rollers are attached to chains. U.S. Pat. No. 4,036,071 and U.S. Pat. No. 4,116,081 disclose sprocket and chain combinations wherein the teeth on the sprockets engage rotatable bushings on the chains. In the latter patent, the chain is a part of a crawler tack for a tracked vehicle. The sprocket teeth and rollers undergo severe operating conditions, and therefore the tooth geometry is selected to minimize stress and wear, and in the case of the tracked vehicles, to also accommodate the buildup of foreign matter between the teeth of the sprocket. In U.S. Pat. No. 4,487,088, the sprocket teeth are relatively widely separated, with the bushings of the chain riding against the roots of the sprocket teeth under high load. These patents disclose relatively large root areas between the sprocket teeth. Conversely, U.S. Pat. No. 3,709,055 discloses teeth and root areas of circular arcs meshing to provide the lobes of a gear pump. U.S. Pat. No. 4,155,599 discloses a driving pinion having epicycloidal gear teeth meshing with cylindrical pins of a rack. The gear teeth are purposely formed with a slender profile to penetrate into the spaces between the cylindrical pins forming the rack. The profile is specifically designed to accommodate differences in pitch distance between the cylindrical pins where racks are joined together lengthwise.

SUMMARY OF THE INVENTION

The invention comprises a combination of cylindrical profile teeth mounted on one gear or a rack and circular arc profile teeth on the other meshing gear. The cylindrical profile teeth are preferably mounted for free rotation about the cylindrical axis of each tooth. Driving engagement of the gears rotates the contacting cylindrical teeth, thereby providing rolling contact between the meshing gear teeth. At any instant, at least two cylindrical teeth on one gear are in engagement with one tooth on the other gear. With the motion of the meshing gears, the cylindrical profile teeth rotate into and out of the roots of the other gear without loss of rolling contact from entrance to exit. With the unique configuration and no loss in rolling contact throughout the movement into and out of the root, backlash within the gear set is effectively prevented. With the constant triple contact and lack of backlash, an exceptionally quiet, smooth and extremely accurate gear set is provided. As a rack and pinion set, the gear set is particularly useful for gantry type robots in manufacturing and finishing of parts such as large sheet metal automotive parts. Accurate movement at up to 120 inches per second at less than three ten thousandths inches backlash are obtained in the gantry configuration. In such embodiments, each cylindrical tooth or pin is mounted in conventional oilite bronze bearings or may be mounted in air bearings if preferred.

DESCRIPTION OF THE PREFERRED EMBODIMENTS

Figure 1:
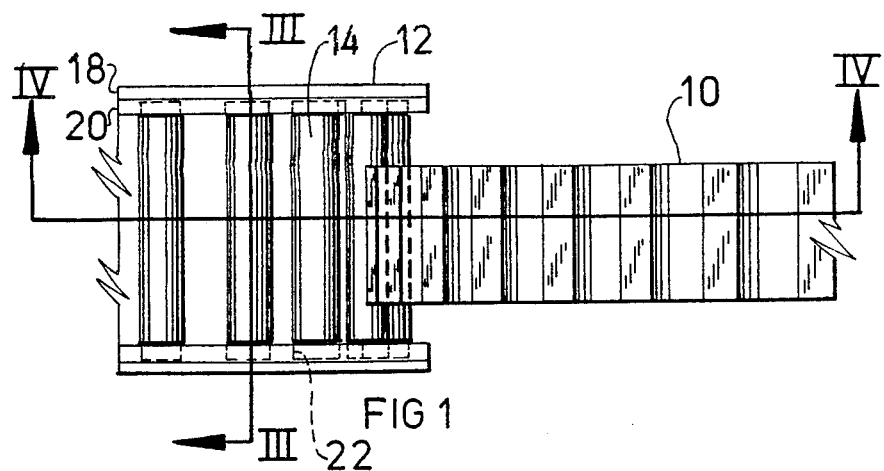
FIG. 1 is a partial plan view of a meshing gear set.
Figure 3:
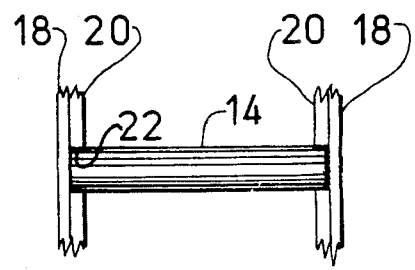
FIG. 3 is a partial section taken along the line III—III of FIG. 1.
Figure 4:
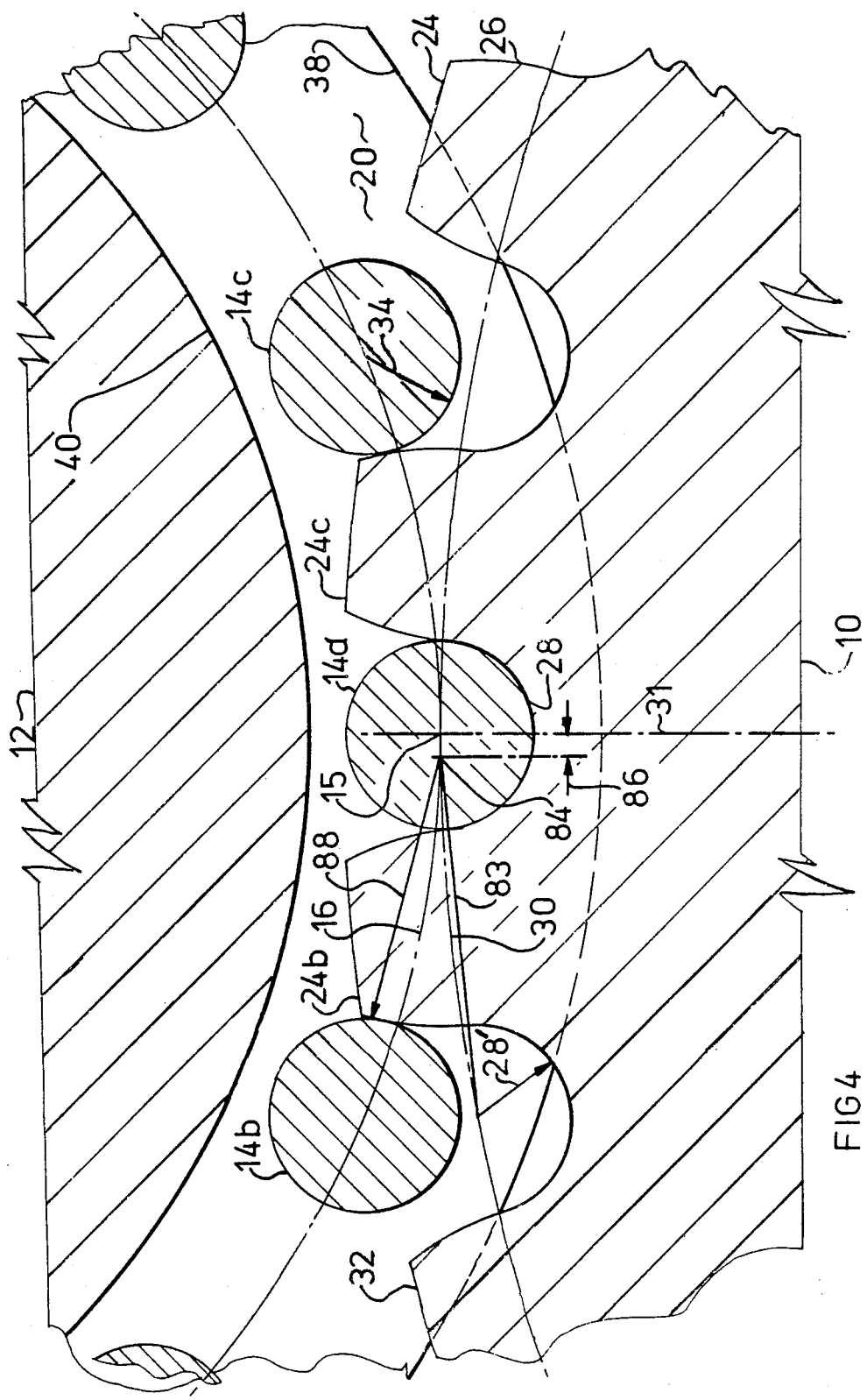
FIG. 4 is a partial section taken along the line IV—IV of FIG. 1.

Illustrated in FIGS. 1 and 4 are a meshing pinion 10 and gear 12. The gear 12 comprises a plurality of pins or rollers 14 having the center of each located on the pitch circle 16 of the gear 12. The pins 14 are retained by double side plates 18 and 20 as best shown in FIG. 3.

The inner side plates 20 include sockets 22, within which pins 14 may rotate. The plates 20 may be made of conventional oilite bronze or oilite bronze bushings or air bearing might be substituted as sockets. The outer plates 18 prevent the pins 14 from moving axially.

Returning to FIGS. 1 and 4, the pinion 10 is provided with a plurality of teeth 24 about its circumference. The teeth 24 are adapted to engage the pins 14 of the gear 12 as best shown in FIG. 4.

The teeth side faces 26 and roots 28 are formed of circular arcs. The root circular arc is substantially semi-circular and centered on the pitch circle 30 of the pinion 10. The pitch circles 30 and 16 are tangent at a point lying on a straight line 31 between the centers of the gear and pinion and momentarily coinciding with the center 15 of the pin 14a in FIG. 4. At this instant, the pin 14a has rolled fully into the root 28 of the pinion 10.

To either side of the pin 14a the next adjacent pins 14b and 14c are in rolling contact with teeth 24b and 24c lying between the pins 14b and 14c and pin 14a. More particularly, left adjacent pin 14b 1 *is in contact with the left face of tooth 24b and next adjacent pin 14c* to the right is in contact with the right face of tooth 24c. Assuming sufficient addendum height 32 at least one tooth 24 is always contacted on both sides by pins 14. The radius 34 of each pin 14 equals the radius 28 of each root 28 on the pinion 10. As more fully described below mathematically, the circular arc face 26 on each side of each tooth 24 is specifically sized and centered to provide the rolling contact on both sides of each tooth 24 with the pins 14 to thereby provide an antibacklash configuration. As such the circular arc profiles of a tooth are symmetric about a radial centerline through the tooth. The outer perimeter of the side plates 18 and 20 of the gear 12 is indicated at 38 and the outer diameter of a web or core for the gear 12 is indicated at 40.

Figure 2:
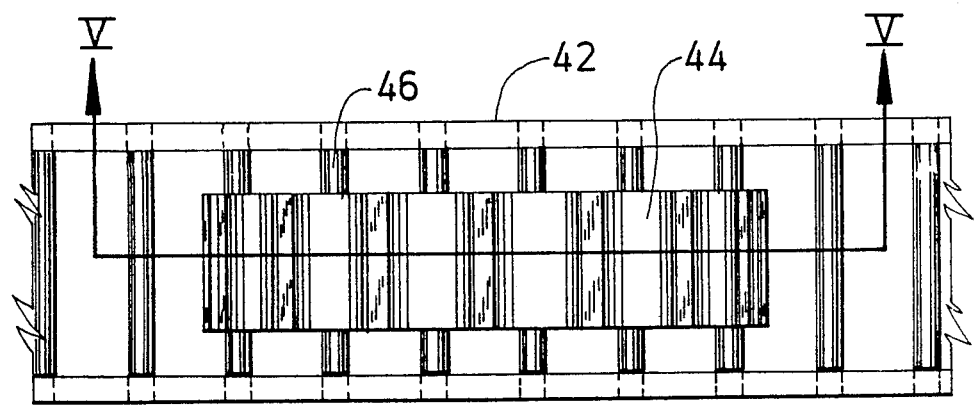
FIG. 2 is a partial plan view of a pinion and rack set.
Figure 5:
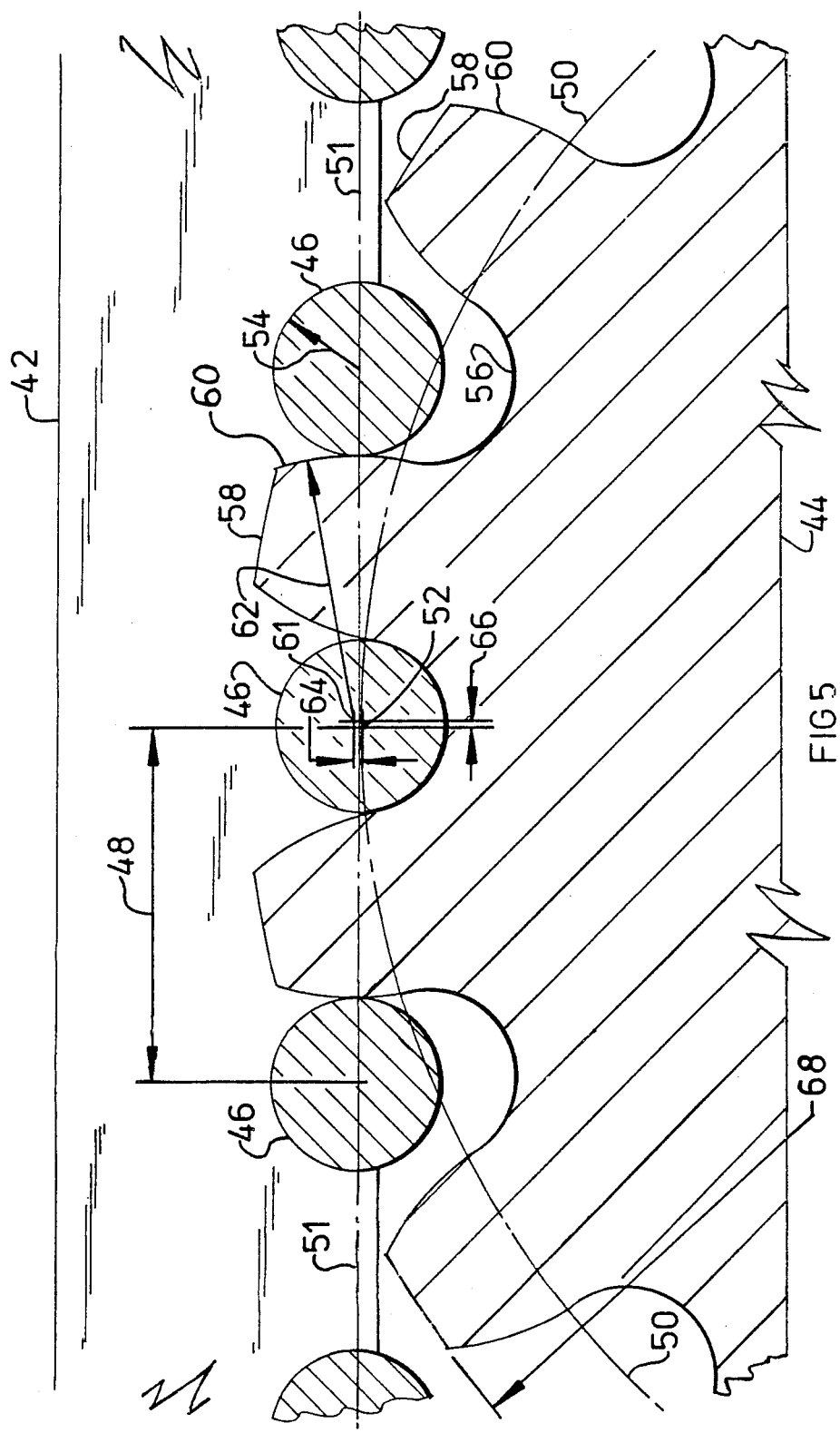
FIG. 5 is a partial section taken along the line V—V of FIG. 2.

Illustrated in FIGS. 2 and 5 are a meshing rack 42 and pinion 44. The rack 42 includes a plurality of rollers or pins 46 spaced at a specified pitch indicated by 48 and retained in the rack frame in a manner similar to that shown in FIG. 3, such that the pins or rollers 46 are free to rotate about their axis. The pitch circle 50 of the pinion 44 is tangent to a line 51 drawn through the centers of the pins 46, and momentarily at the center of pin 46a indicated at 52. As above, the radius 54 of each pin 46 is equal to the radius of the circular arc root 56 of each root between the teeth 58 of the pinion 44. The root 56 is substantially semicircular and centered on the pitch circle 50 but also limited by the pitch circle 50. The circular arc faces 60 smoothly blend into the circular arc roots 56 between the teeth. The circular arc 60 of each face is centered at 61 above the pitch circle 50 of the pinion 44 and inboard of the center of the root circle 56 in the next adjacent root, as shown by the radial line 62, the radial spacing indicated at 64 and the tangential spacing 66. As above, the tooth addendum 68 is sufficient to assure that at least one tooth 58 is between two pins 46 and in rolling contact therewith, thus assuring that backlash is prevented.

Figure 6:
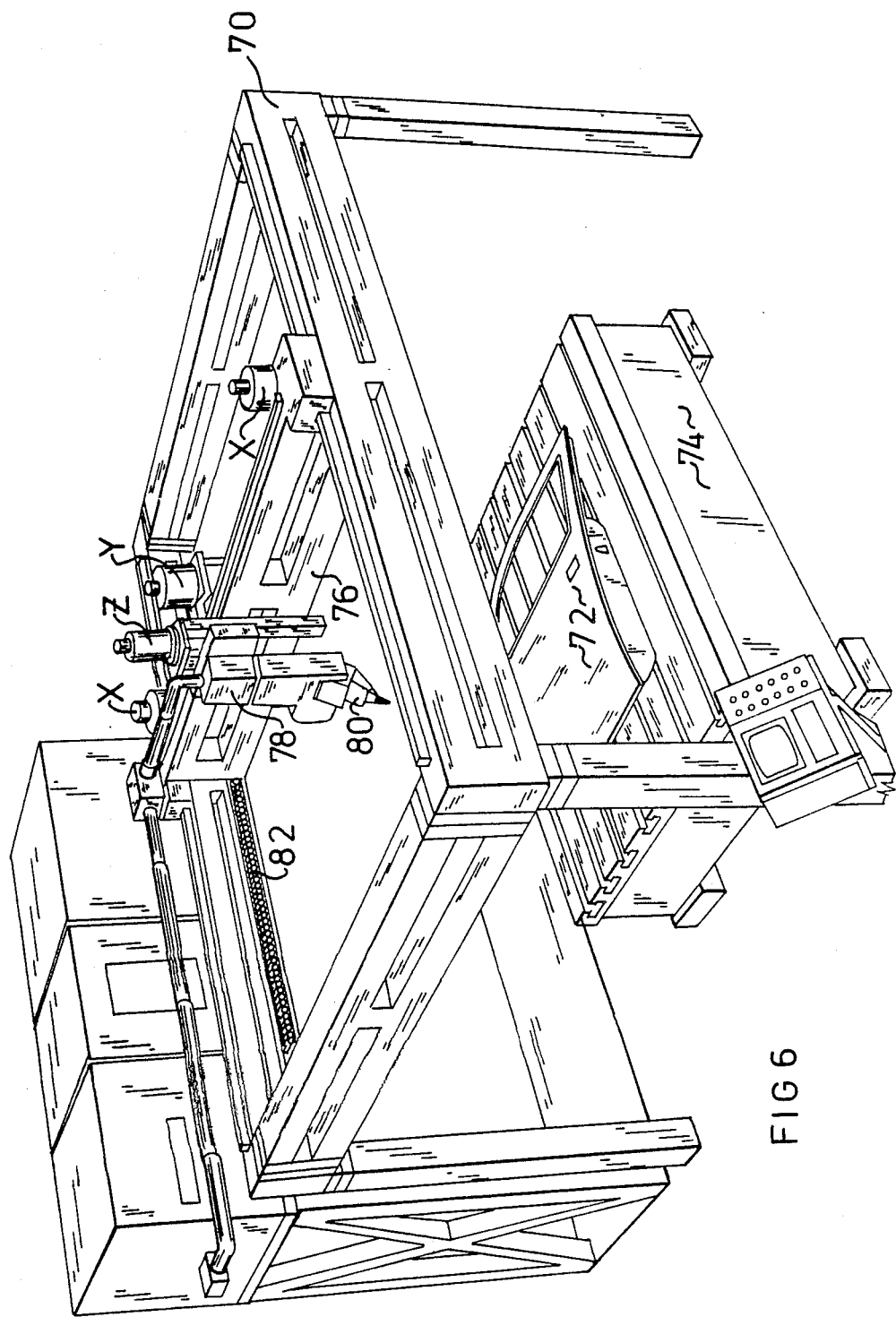
FIG. 6 is a perspective view of a robot gantry adapted to employ the rack and pinion set.

FIG. 6 illustrates a robot gantry for which the rack and pinion or gear and pinion sets above are particularly suited. The robot gantry comprises an overhead frame 70 supported above a work piece 72 and platform 74. A horizontally moveable transverse frame 76 is suspended from the frame 70 and on the transverse frame 76 is a horizontally and vertically moveable assembly 78 equipped with a suitable tool or measuring device 80. A rack 82, constructed in accordance with the above disclosure, is mounted horizontally along the frame 70 on one or both sides, and a motor driven pinion is mounted on the transverse frame 76. If racks 82 are provided on both sides of the frame 70, pinions meshing therewith are provided at both ends of the transverse frame 76 and driven by the motors indicated at "X". In a similar matter, racks and pinions driven by the motors indicated "y" and "X" can provide the horizontal transverse movement and the vertical movement, repectively, for the tool 80.

As noted above, the centers of the root circular arcs 28 and 56 are located on the pitch circle of the pinions at circular pitch intervals. The centers of the face circular arcs 60 are located above the pitch circle of the pinion and inboard of the pinion radius passing through the next adjacent notch circular arc center. Mathematically, the locations of the pinion face circular arc centers and the radii of the face arcs of the teeth are described by the following set of equation for the rack and pinion:

The distance 64 above the pitch circle is defined by:

$$dR = D_p(1 - \cos(180/N))/2$$

The inboard eccentricity 66 of the face circular arc center is defined by:

$$E = D_p(Pi/N - \sin(180/N))$$

The sum of the pin 46 radius and the pinion face radius 62 is described as:

$$R_f + R_p = (D_p/2)^2 + D_i^2 - D_p D_i \cos(360/N - \text{Arc tan}(E/(d_p/2 + dR))) - CE$$

where:
$D_p$ = pitch diameter of pinion
N = number of pinion teeth
$D_i = ((D_p/2 + dR)^2 + E^2)^{1/2}$ the radius of the location of the face arc center
C = clearance factor, $0 < C < 1$
$R_p$ = pin radius
$R_f$ = tooth face radius
Pi = 3.141592654

The selection of the pin radius or the pinion face circular arc radius may be made on the basis of strength considerations. The establishment of either the pin radius or the face circular arc radius fixes the other in satisfying the third equation.

The addendum height above the pitch circle is determined by the following relationship:

$$a = KD_p/N$$

where:
K = constant, $0.8 < K < 1.2$
K may be adjusted within this range to eliminate inteference or increase the contact arc of the rack and pinion.

As an example of a suitable rack and pinion the following dimensions may be specified:
Pitch = 0.63814
$D_p$ = 3.25"
N = 16
dR = 0.0094"
E = 0.003"
$D_i$ = 0.47725"
$R_p$ = 0.1562"
$R_f$ = 0.1563"

K=1.083
C=0.002"

For the gear and pinion, the pinion tooth face circular arc center is located on the chord 83 between two adjacent root centers as shown at 84 in FIG. 4. The inboard eccentricity 86 of the face circular arc may be determined by the following equation:

$$dF = D_t \sin(360/N_t) - D_g(\sin 360/N_g)$$

The tooth face circular arc radius 88 is determined from:

$$R_f = D_g \sin(360/N_g) = R_g$$

where:
- $D_g$ = pitch diameter of gear
- $D_t$ = pitch diameter of pinion
- $N_g$ number of pins or intervals
- $N_t$ = number of teeth or intervals
- $R_f$ = tooth circular arc face radius
- $R_g$ = pin radius As an example of a suitable rack and pinion the following dimensions may be specified:
- Pitch = 0.57687"
- $D_g$ = 2.938"
- $D_t$ = 5.876"
- $N_g$ = 16
- $N_t$ = 32
- $R_f$ = 0.4379"
- $R_g$ = 0.1406"
- $R_q$ = 0.04718"

I claim:

1. A meshing gear construction comprising a first gear having a plurality of fixed teeth extending therefrom, said teeth alternatingly separated by a plurality of roots each having a radial centerline, faces on either side of each fixed tooth, each root being a continuation of a pair of faces of two adjacent teeth, a second gear having a plurality of rollers thereon rotatble relative to the second gear, said rollers meshing with the fixed teeth of the first gear, and said meshing comprising rolling contact of at least two rollers with one first gear fixed tooth at all instants of motion wherein said rollers comprise cylindrical rollers and teh faces of said fixed teeth comprise circular arcs in profile and wherein a radial centers of fixed tooth circular arc face lies otsdie a pitch circle of the first gear and between the circular arc face and the radial centerline of an adjacent root.

2. The meshing gear construction of claim 1 wherein the circular arc faces of each fixed tooth have the same radius of curvature.

3. The meshing gear construction of claim 1 wherein the roots between at least some of the fixed teeth are substantially semi-circular in profile having radii substantially equal to the radii of said cylindrical rollers.

4. The meshing gear construction of claim 1 wherein the second gear comprises a rack.

5. A meshing gear construction comprising a first gear having a plurality of fixed teeth extending therefrom, said teeth alternatingly separated by a plurality of roots each having a radial centerline, faces on either side of each fixed tooth, each root being a continuation of a pair of faces of two adjacent teeth, a second gear having a plurality of rollers thereon rotatable relative to the second gear, said rollers meshing with the fixed teeth of the first gear, and said meshing comprising rolling contact of at least two rollers with at least one first gear fixed tooth at all instants of motion, wherein said rollers comprise cylindrical rollers and the faces of said fixed teeth comprise circular arcs in profile and wherein a radial center of a fixed tooth circular arc face lies on a chord between the root radial centerline between said pair of faces and adjacent root radial centerline intersections with a pitch circle of the first gear and between said circular arc face and the radial centerline of the adjacent root.

6. A meshing gear construction comprising a rack and pinion, fixed teeth on one of said rack and pinion and freely rotatable rollers on the other of said rack and pinion, said fixed teeth alternatingly separated by a plurality of roots each having a radial centerline, faces on either side of each fixed tooth, each root being a continuation of a pair of faces of two adjacent teeth, said rollers in meshing engagement with the fixed teeth, the engagement providing rolling contact of a least two rollers with a fixed tooth at all instants of motion, and,
the faces of the fixed teeth comprising in part circular arcs in profile wherein a radial center of a fixed tooth circular arc face lies outside a pitch circle of the fixed teeth and between said circular arc face and the radial centerline of an adjacent root.

7. The meshing gear construction of claim 6 wherein the circular arc profile faces of at least one fixed tooth are symmetric about a radial centerline through said fixed tooth.

8. The meshing gear construction of claim 6 wherein the rollers are rotatably affixed to the rack and, wherein the geometric relationships of the rollers and faces are defined by:

$$dR = D_p(1 - \cos(180/N))/2$$

$$E\ 32\ D_p(Pi/N - \sin(180/N))$$

$$R_f + R_p = (D_p/2)^2 + D_i^2 - D_p D_i \cos(360/N - \arctan(E/(D_p/2 + dR)) - CE$$

where:
where:
- dR = distance of the fixed tooth circular arc face center above pinion pitch circle;
- E = inboard eccentricity of the circular arc face center;
- $D_p$ = pitch diameter of the pinion;
- N 32 number of pinion teeth;
- $D_i = ((D_p/2\ 30\ dR)^2 + E^2)^{1/2}$;
- C = clearance factor, 0 < C < 1;
- $R_p$ = roller radius;
- $R_f$ = tooth face circular arc radius;
- Pi = 3.141592654

9. The meshing gear construction of claim 8 wherein the addendum height above the pitch circle of the pinion is defined by:

$$a = K\ D_p/N$$

Where:
- a = adendum height
- K = constant, 0.8 < K < 1.2
- $D_pp$ = pitch diameter of the pinion
- N = number of pinion teeth.

10. A meshing gear construction comprising a first gear having a plurality of fixed teeth extending therefrom, said teeth alternatingly separated by a plurality of roots each having a radial centerline, faces on either side of each fixed tooth, each root being a continuation of a pair of faces of two adjacent teeth, a second gear having a plurality of rollers thereon rotatable relative to the second gear, said rollers meshing with the fixed teeth of the first gear, and,
the faces of the fixed teeth comprising in part circular arcs in profile wherein a radial center of a fixed tooth circular arc face lies on a chord between the root radial centerline between said pair of faces and adjacent root radial centerline intersections with a pitch circle of the first gear and between said circular arc face and the radial centerline of an adjacent root.

11. The meshing gear construction of claim 10 wherein the circular arc profile faces of at least one fixed tooth are symmetric about a radial centerline through said fixed tooth.

12. The meshing gear construction of claim 10 wherein the geometric relationships of the rollers and faces are defined by:

$$dF = D_t \sin(360/N_t) - D_g(\sin 360/N_g)$$
$$R_f = D_g \sin(360/N_g) - R_g$$

where:
$dF$ = inboard eccentricity of the circular arc face center;
$R_f$ = tooth face circular arc radius;
$D_g$ = pitch diameter of roller gear;
$D_t$ = pitch diameter of fixed tooth gear;
$N_g$ = number of rollers;
$N_t$ = number of fixed teeth;
$R_g$ = roller radius.

13. The meshing gear construction of claim 10 wherein the addendum height above the pitch circle of the fixed teeth is defined by:

$$a = KD_t/N_t$$

Where:
$a$ = addendum height
$K$ = constant, $0.8 < K < 1.2$
$D_t$ = pitch diameter of fixed tooth gear
$N_t$ = number of fixed teeth.

* * * * *

UNITED STATES PATENT AND TRADEMARK OFFICE
CERTIFICATE OF CORRECTION

PATENT NO. : 4,879,920

DATED : November 14, 1989

INVENTOR(S) : Ewald F. Kerkhoff

It is certified that error appears in the above-identified patent and that said Letters Patent is hereby corrected as shown below:

Col. 1, line 6:   Delete "gear" and substitute --gears--.

Col. 1, line 68:  Delete "tack" and substitute --track--.

Col. 3, line 4:   Delete "bearing" and substitute --bearings--.

Col. 3, line 42:  Delete "axis" and substitute --axes--.

Col. 3, line 52:  Insert --tooth-- before "face".

Col. 4, line 8:   Delete "y" and "X" and substitute -- Y -- and -- Z --.

Col. 4, line 19:  Delete "equation" and substitute --equations--.

Col. 4, line 34:  Delete "dp/2" and substitute --Dp/2--.

Col. 5, line 12:  Delete the second "=" and substitute -- - --.

Col. 5, line 15:  Insert -- = -- after "Ng".

Col. 5, line 28:  Delete "Rg" and substitute -- dF --.

Col. 5, line 36:  Delete "rotatble" and substitute --rotatable--.

Col. 5, line 41:  Delete "teh" and substitute --the--.

Col. 5, line 43:  Delete "centers" and substitute --center--.

Col. 5, line 43:  Delete "otsdie" and substitute --outside--.

Col. 6, line 31:  Delete "32" and substitute -- = --.

Col. 6, line 34:  Delete "where".

UNITED STATES PATENT AND TRADEMARK OFFICE
CERTIFICATE OF CORRECTION

PATENT NO. : 4,879,920

DATED : November 14, 1989

INVENTOR(S) : Ewald F. Kerkhoff

It is certified that error appears in the above-identified patent and that said Letters Patent is hereby corrected as shown below:

Col. 6, line 42: Delete "32" and substitute -- = --.

Col. 6, line 43: Delete "30" and substitute -- + --.

Col. 6, line 56: Delete second "p".

Col. 8, line 3: Insert -- = -- after "$R_f$".

Signed and Sealed this

Third Day of March, 1992

Attest:

HARRY F. MANBECK, JR.

Attesting Officer     Commissioner of Patents and Trademarks